United States Patent
Li et al.

(10) Patent No.: US 12,250,929 B2
(45) Date of Patent: Mar. 18, 2025

(54) PET FEEDER

(71) Applicant: UBTECH ROBOTICS CORP LTD, Shenzhen (CN)

(72) Inventors: Jin Li, Shenzhen (CN); Yudong Liu, Shenzhen (CN); Xinshui Huang, Shenzhen (CN); Xianglong Li, Shenzhen (CN); Jun Li, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 18/381,181

(22) Filed: Oct. 18, 2023

(65) Prior Publication Data

US 2024/0415094 A1 Dec. 19, 2024

(30) Foreign Application Priority Data

Jun. 19, 2023 (CN) .......................... 202310733763.6
Sep. 19, 2023 (CN) .......................... 202311215118.1

(51) Int. Cl.
  *A01K 5/02* (2006.01)
  *F25B 21/04* (2006.01)

(52) U.S. Cl.
  CPC .............. *A01K 5/0275* (2013.01); *A01K 5/02* (2013.01); *F25B 21/04* (2013.01); *A01K 5/0291* (2013.01)

(58) Field of Classification Search
  CPC ...... A01K 5/0275; A01K 5/0291; F25B 21/04
  See application file for complete search history.

(56) References Cited

U.S. PATENT DOCUMENTS

| | | |
|---|---|---|
| 6,349,671 B1 | 2/2002 | Lewis et al. |
| 6,766,766 B1 | 7/2004 | Elliott |
| 2005/0066905 A1* | 3/2005 | Morosin ............... A01K 5/0291 119/51.02 |
| 2014/0090601 A1 | 4/2014 | Stone |
| 2021/0144960 A1* | 5/2021 | Taneja .................... A01K 7/027 |
| 2023/0389516 A1* | 12/2023 | Qiu ....................... A01K 5/0114 |

FOREIGN PATENT DOCUMENTS

| | | |
|---|---|---|
| CN | 102669001 B | 11/2015 |
| CN | 207305716 U | 5/2018 |

\* cited by examiner

*Primary Examiner* — Christopher D Hutchens
*Assistant Examiner* — Steven J Shur

(57) ABSTRACT

A pet feeder includes: a housing, a heat conduction member, a temperature adjustment structure and a heat dissipation member that are arranged in the housing, a tray, a cover, and an actuating mechanism. The temperature adjustment structure includes a thermoelectric cooling member and a control module. The thermoelectric cooling member includes a first side connected to the heat conduction member and a second side in contact with the heat dissipation member. The control module is to control the first side of the thermoelectric cooling member to heat or cool. The tray is arranged in the housing and connected to the heat conduction member, and defines two compartments for placing pet food. The cover is arranged on the tray and defines a window in communication with the at least two compartments. The actuating mechanism is arranged in the housing and is to rotate the tray or the cover.

20 Claims, 9 Drawing Sheets

PET FEEDER

CROSS REFERENCE TO RELATED APPLICATIONS

This application claims priority to Chinese Patent Application Nos. 202310733763.6, filed on Jun. 19, 2023, and 202311215118.1, filed on Sep. 19, 2023, which are hereby incorporated by reference herein as if set forth in their entirety.

TECHNICAL FIELD

The present disclosure generally relates to pet feeders, and particularly to a pet feeder that can keep pet food fresh.

BACKGROUND

A pet feeder is a device for feeding pets (e.g., dogs and cats). With the continuous development of pet food, there are more and more types of pet food. Generally, pet food can be divided into two categories: wet food and dry food. Due to the economy and convenience of dry food, most pets currently consume dry food. However, eating dry food for a long time will cause pets to take in too little water, which is not good for the health of pets. Therefore, consuming wet food can provide pets with more comprehensive nutrition, and adequate water intake is beneficial to pets' health. However, wet food can easily spoil. How to store wet food in the feeder for a long time has troubled many pet owners.

Feeders currently on the market usually use frozen blue ice to keep wet food fresh. This method can keep the food fresh for a short time. On the one hand, the blue ice needs to be frozen and taken out into the feeder every day. The operation is complicated and requires a lot of time for maintenance. On the other hand, using frozen blue ice can easily cause the temperature of a portion of the wet food to be too low, which can easily cause indigestion, diarrhea or flatulence in pets.

Therefore, there is a need to provide a pet feeder to overcome the above-mentioned problem.

BRIEF DESCRIPTION OF DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
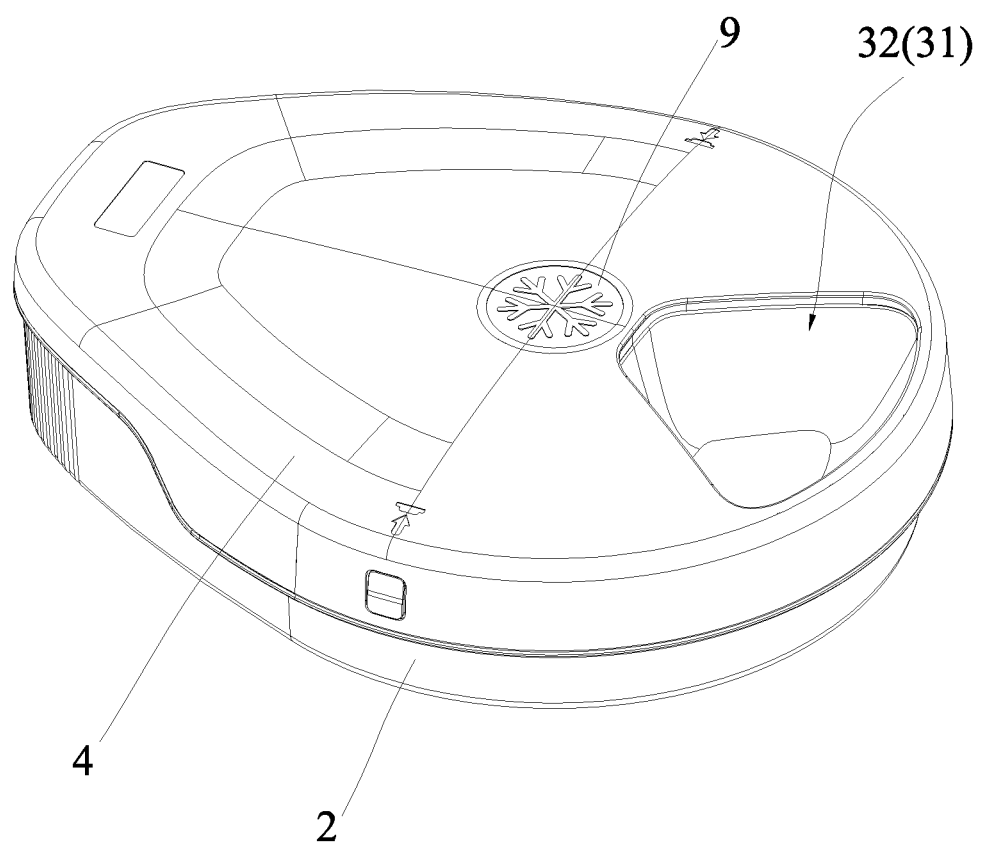
FIG. 1 is a schematic isometric view of a pet feeder according to one embodiment.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

Figure 2:
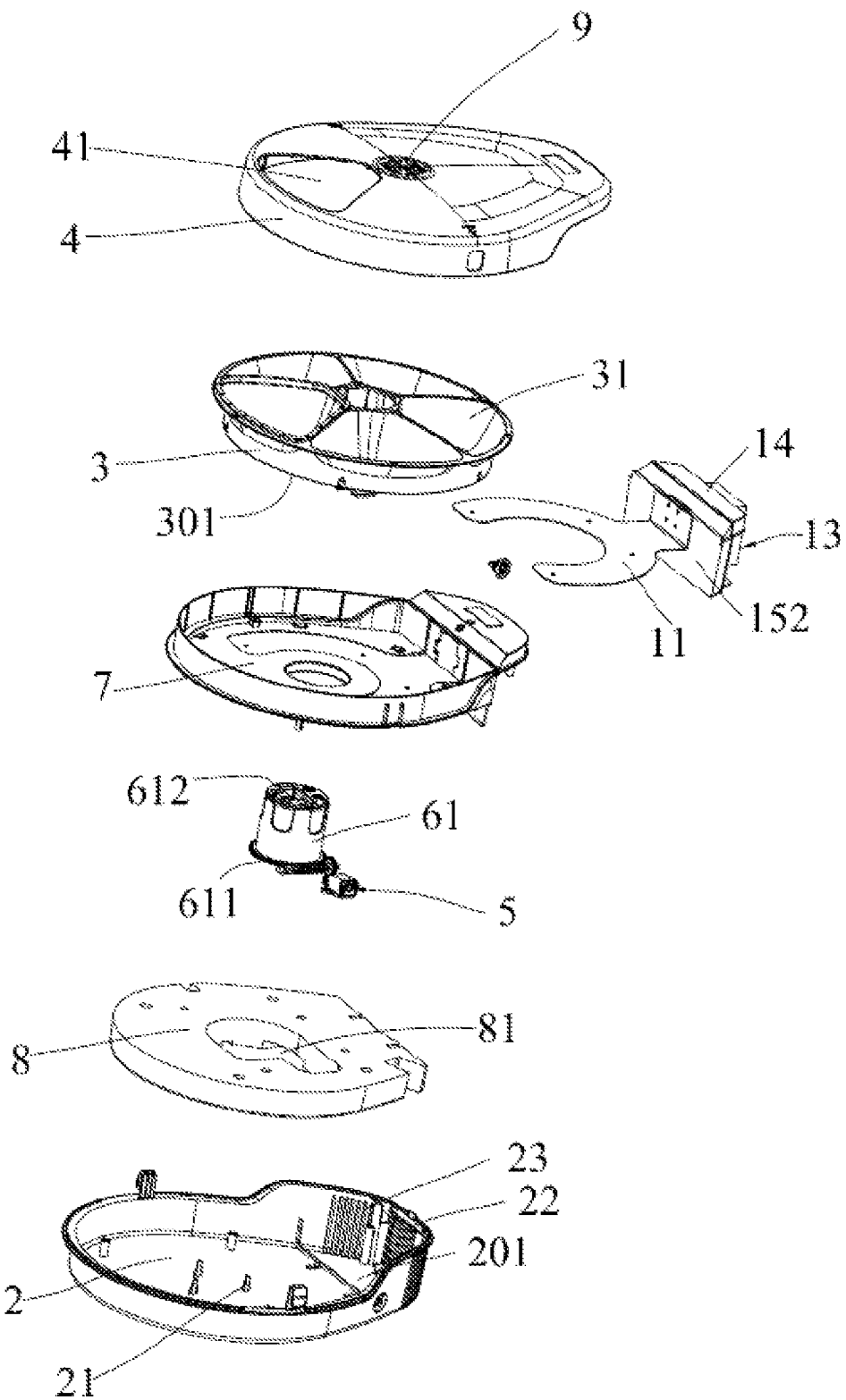
FIG. 2 is an isometric exploded view of the pet feeder.

Referring to FIGS. 1 and 2, a pet feeder according to one embodiment of the present disclosure will be described. The pet feeder can hold wet food therein and keep the wet food fresh. The pet feeder can hold dry food therein. There is no restriction on this. In one embodiment, the pet feeder includes a housing 2, a tray 3, a cover 4 and an actuating mechanism 5.

Figure 7:
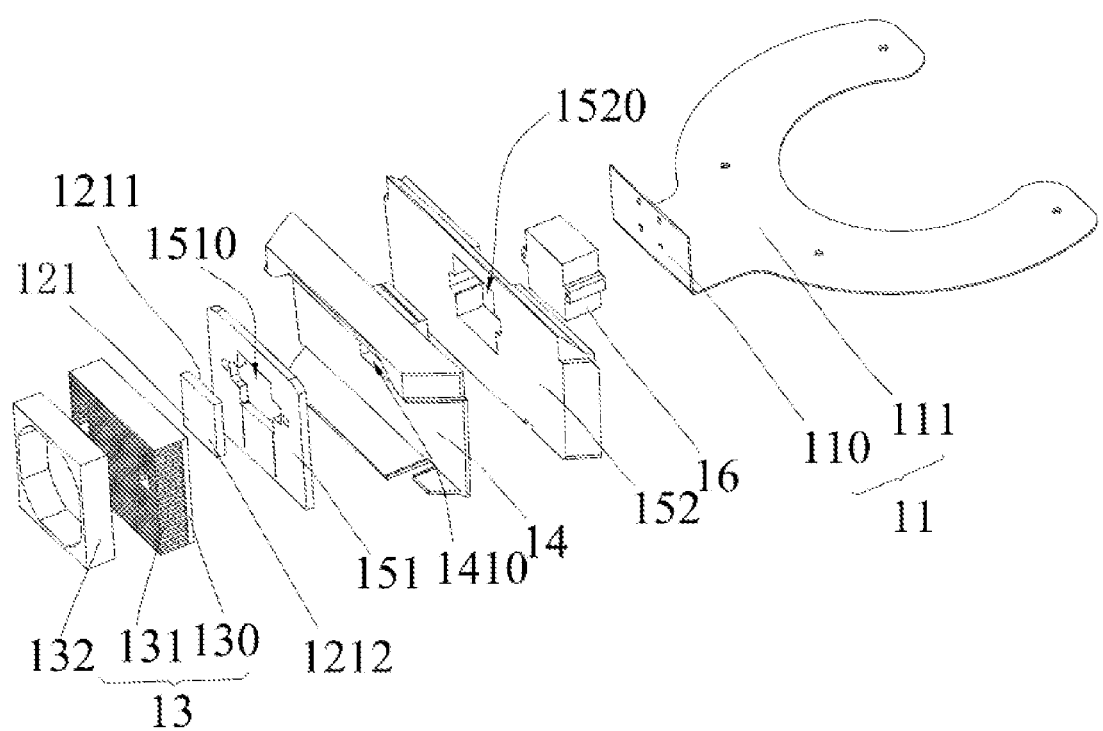
FIG. 7 is an isometric exploded view of the assembly of FIG. 6.

Referring to FIG. 7, in one embodiment, the housing 2 is flat and hollow and includes a bottom plate and lateral wall protruding from the bottom plate and having an open end. The housing 2 holds a heat conduction member 11, a temperature adjustment structure 12 and a heat dissipation member 13 therein. The temperature adjustment structure 12 includes a thermoelectric cooling member 121 and a control module 122, both of which are connected together through lines. The thermoelectric cooling member 121 has a first side 1211 and a second side 1212 opposite the first side 1211. The first side 1211 of the thermoelectric cooling member 121 is in contact with the surface of the heat conduction member 11, so that heat can be transferred between the thermoelectric cooling member 121 and the heat conduction member 11. The second side 1212 of the thermoelectric cooling member 121 is in contact with the surface of the heat dissipation member 13, so that the heat generated by the thermoelectric cooling member 121 can be transferred to the heat dissipation member 13.

The tray 3 is arranged in the housing 2 and connected to the heat conduction member 11. The tray 3 defines at least two compartments 31, and wet food can be placed in each compartment 31. The cover 4 defines a window 41 that can be in communication with each compartment 31. When one of the compartments 31 is in communication with the window 41, the wet food in the compartment 31 is available to pets through the window 41.

The actuating mechanism 5 is arranged in the housing 2, and the output end of the actuating mechanism 5 is connected to the tray 3. That is, the actuating mechanism 5 can drive the tray 3 to rotate. In an alternative embodiment, the output end of the actuating mechanism 5 can be connected to the cover 4. That is, the actuating mechanism 5 can drive the cover 4 to rotate.

The thermoelectric cooling member 121 uses the Peltier effect to create a heat flux at the junction of two different types of materials. A Peltier cooler, heater, or thermoelectric heat pump is a solid-state active heat pump which transfers heat from one side of the device to the other, with consumption of electrical energy, depending on the direction of the current. Such an instrument is also called a Peltier device, Peltier heat pump, solid state refrigerator, or thermoelectric cooler (TEC) and occasionally a thermoelectric battery. It can be used either for heating or for cooling, although in practice the main application is cooling. It can also be used as a temperature controller that either heats or cools. The control module 122 controls the first side 1211 of the thermoelectric cooling member 121 to heat or cool. When cooling is required, the control module 122 controls the first side 1211 of the thermoelectric cooling member 121 to cool. When heating is required, the control module 122 controls the thermoelectric cooling member 121 to heat. The first side 1211 is heated. The heating function can be realized without additional heating structure, and the overall structure is relatively simple. Heat can be transferred between the thermoelectric cooling member 121 and the tray 3 through the heat conduction member 11, so that the temperature of the wet food in the tray 3 can be maintained at a desired temperature, thereby avoiding the temperature of wet food being too high in some portions and too low in other portions, which can achieve better preservation effect. In one embodiment, the thermoelectric cooling member 121 can maintain the temperature of wet food within 10 degrees Celsius.

Since wet food is held in each compartment 31, when the tray 3 rotates, the wet food placed on it is driven to rotate. When one of the compartments 31 is in communication with and aligns with the window 41, the wet food in the compartment 31 is available to pets. Since wet food is held in each compartment 31, when the wet food in one of the compartments 31 is consumed, the tray 3 will be controlled to continue to rotate until the next compartment 31 is in communication with and aligns with the window 41. That is, through the relative rotation between the tray 3 and the cover 4, one compartment 31 can be selectively aligned with the window 41, thereby achieving the purpose of selective feeding. It can be understood that the tray 3 rotates but the cover 4 stays stationary, and a pet can eat the wet food in one compartment 31 without changing its position.

In another embodiment, the cover 4 can rotate while the tray 3 remains stationary. The window 41 can thus be driven to align with a certain compartment 31, so that the pet can eat the wet food held in the compartment 31 through the window 41. As long as the purpose of selective feeding can be achieved, there are no restrictions here.

Compared with some conventional pet feeders, the pet feeder described above has the following beneficial effects.

In one aspect, the control module 122 controls the heating or cooling of the first side 1211 of the thermoelectric cooling member 121. The structure is simple and no additional heating structure is required to complete the heating function, so that wet food can be heated or cooled. It solves the problems of inconvenient operations caused by the use of frozen blue ice for freshness preservation. It is simple to operate, and can prevent the temperature of wet food from being too high in some portions and too low in other portions, and the preservation effect is better.

In another aspect, the actuating mechanism 5 is employed to drive the tray 3 or the cover 3 to rotate, and a number of compartments 31 are defined in the tray 3. Therefore, a certain compartment 31 can selectively align with the window 41 to achieve the purpose of selective feeding.

The thermoelectric cooling member 121 utilizes the Peltier effect of semiconductor materials. When direct current passes through a galvanic couple formed by two different semiconductor materials in series, heat can be absorbed and released at opposite ends of the galvanic couple, thereby achieving cooling or heating. It should be noted that the control module 122 controls the switching time of cooling or heating of the thermoelectric cooling member 121 by switching or timing. The thermal conduction member 11 has a fan-shaped structure and is made of aluminum material, which has low cost and excellent heat or cold conduction effect.

Figure 9:
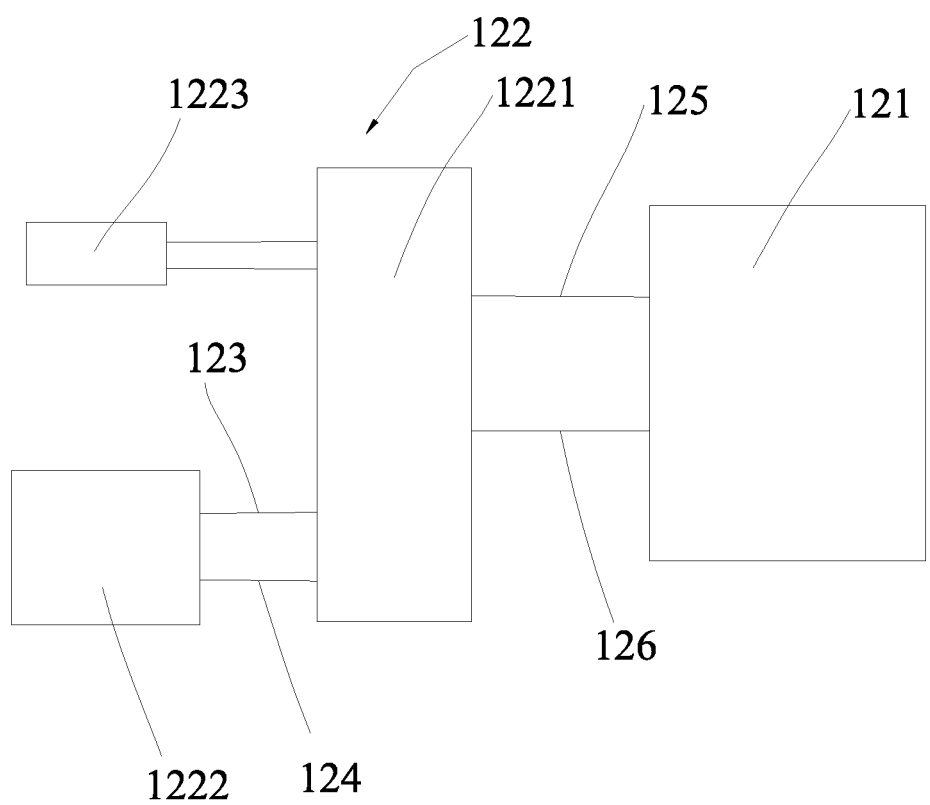
FIG. 9 is schematic block diagram of a temperature adjustment structure of the pet feeder.

Referring to FIG. 9, in one embodiment, the control module 122 includes a driver chip 1221, a controller 1222 and a power supply 1223. The driver chip 1221 is electrically connected to the thermoelectric cooling member 121, and the controller 1222 is electrically connected to the driver chip 1221. The controller 1222 controls the forward and reverse conduction of the thermoelectric cooling member 121 through the driver chip 1221. That is, the controller 1222 can control a direction of electrical current flowing in the thermoelectric cooling member 121 through the driver chip 1221. A first direction of the electrical current flowing in the thermoelectric cooling member 121 results in heating of the first side 1211 of the thermoelectric cooling member 121, while a second direction of the electrical current flowing in the thermoelectric cooling member 121 results in cooling of the first side 1211 of the thermoelectric cooling member 121. The power supply 1223 is electrically connected to the driver chip 1221 for supplying power to the driver chip 1221.

In one embodiment, the controller 1222 is electrically connected to the driver chip 1221 through a first control line 123 and a second control line 124, and the driver chip 1221 is electrically connected to the thermoelectric cooling member 121 through a first output line 125 and a second output line 126. The driver chip 1221 is powered by the power supply 1223 and controls the first control line 123, the second control line 124, the first output line 125 and the second output line 126 to output signals. The controller 1222 changes the positive and negative polarities of the output by changing the port states of the first control line 123 and the second control line 124. For example, if the controller 1222 controls the first control line 123 to be 1 and the second control line 124 to be 0, the output of the first output line 125 will be positive and the output of the second output line 126 will be negative. In this case, the thermoelectric cooling member 121 is working in a cooling state. That is, the side of the thermoelectric cooling member 121 facing the heat conduction member 11 is a cold surface. On the contrary, if the controller 1222 controls the first control line 123 to be 0 and the second control line 124 to be 1, the output of the first output line 125 will be negative and the output of the second output line 126 will be positive. In this case, the thermoelectric cooling member 121 is working in a heating state. That is, the side of the thermoelectric cooling member 121 facing the heat conduction member 11 is a hot surface.

Figure 8:
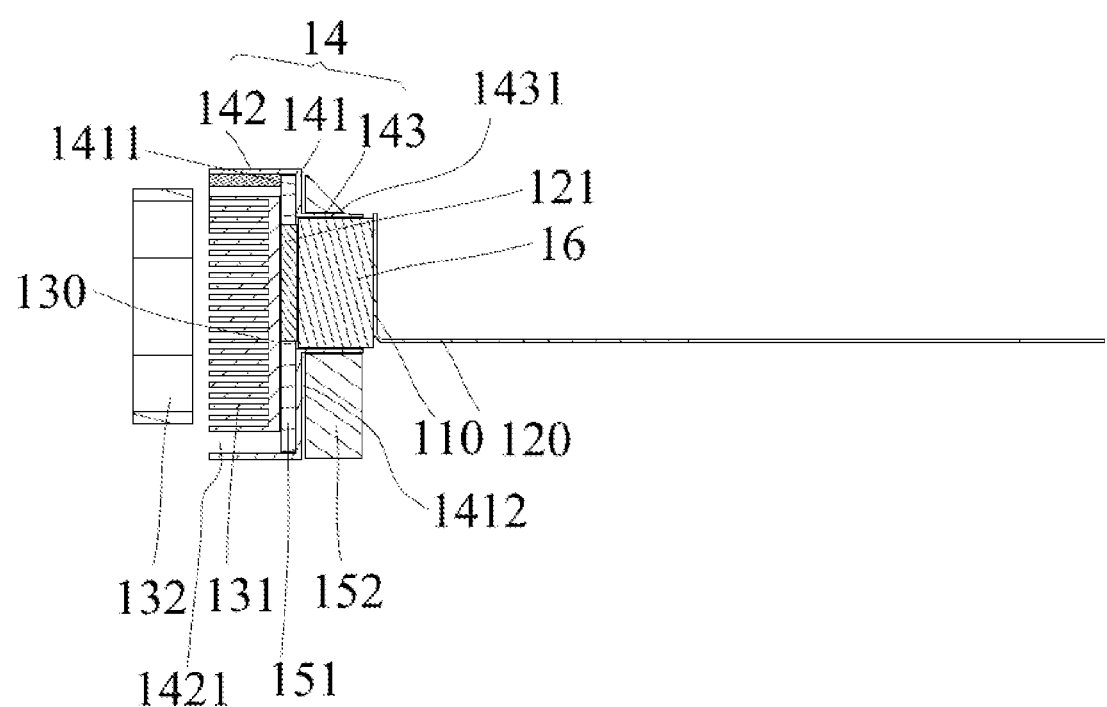
FIG. 8 a planar cross-sectional view of the assembly of FIG. 6.

Referring to FIGS. 7 and 8, in one embodiment, when the housing is placed on the ground or a desktop, the heat conduction member 11, the thermoelectric cooling member 121 and the heat dissipation member 13 are substantially horizontally arranged. It should be noted that the heat conduction member 11, the thermoelectric cooling member 121 and the heat dissipation member 13 may be arranged in other manners, but they are preferably not stacked over each other in the vertical direction when the housing is placed on a horizontal surface (e.g., the ground or a desktop). The heat conduction member 11, the thermoelectric cooling member 121 and the heat dissipation member 13 can be arranged sequentially along the same straight line. Alternatively, they can be arranged along a curve, as long as the heat conduction member 11, the heat dissipation member 121 and the heat dissipation member 13 can be in contact with one another. This avoids heat accumulation caused by the stacking of the three components along the heightwise direction of the housing 2, and avoids increasing the overall thickness of the feeder.

Figure 3:
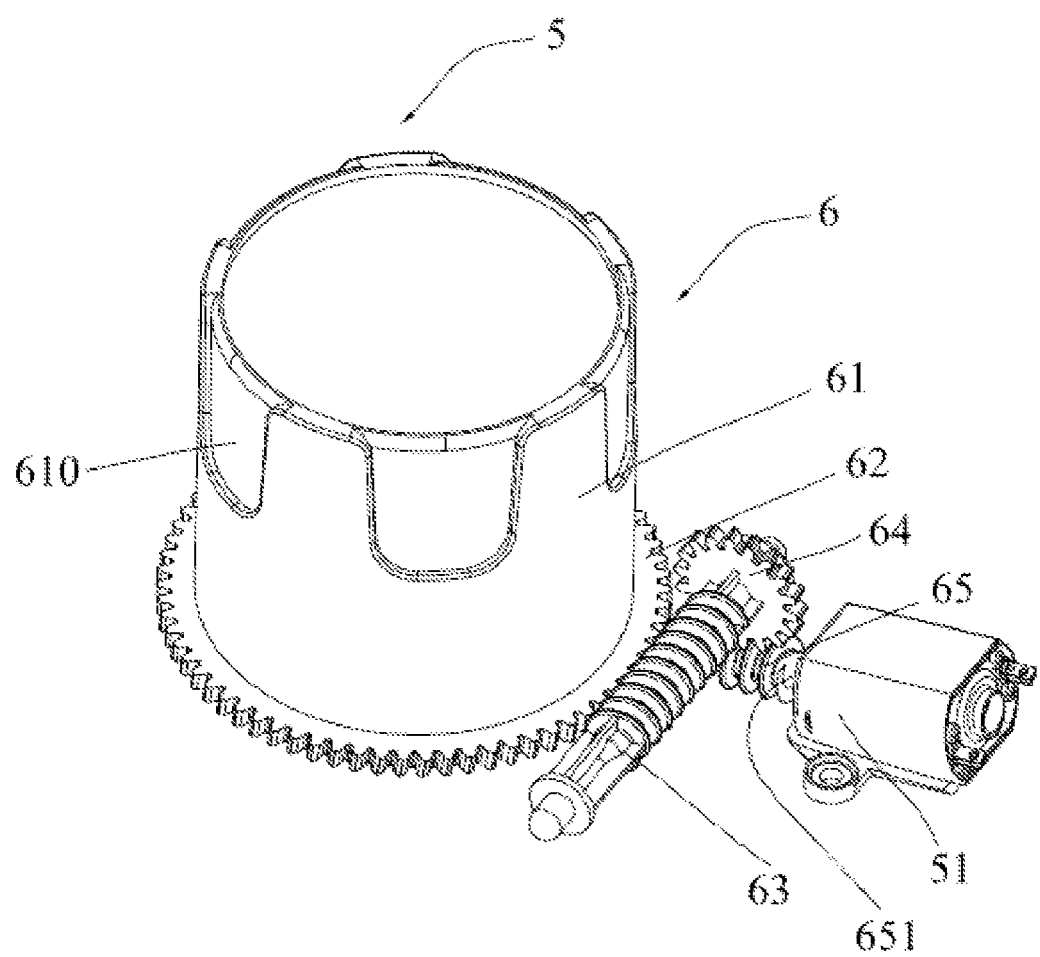
FIG. 3 is an isometric view of an assembly including an actuator and a transmission mechanism of the pet feeder.

Referring to FIGS. 2 and 3, in one embodiment, the actuating mechanism 5 includes an actuator 51 and a transmission mechanism 6. The actuator 51 is arranged in the housing 2, and has the above-mentioned output end. The output end is connected to the tray 3 and is to drive the tray 3 to rotate relative to the housing 2. The transmission mechanism 6 is disposed in the housing 2 and is connected between the tray 3 and the actuator 51. The transmission mechanism 6 enables the tray 3 to rotate stably. In one embodiment, the actuator 51 can be a motor, and the output shaft of the motor is connected with the transmission mechanism 6 to drive the tray 3 to rotate. The motion of the actuator 51 is transmitted through the transmission mechanism 6, so that a smaller actuator 51 can be employed, which can save costs to a certain extent.

In one embodiment, the tray 3 and the heat conduction member 11 are spaced apart from each other. That is, a gap is formed between the tray 3 and the heat conduction member 11. The gap can be in the range of 0.5 mm to 1.5 mm. Specifically, the gap between the tray 3 and the heat conduction member 11 can be 0.5 mm, 0.6 mm, 0.7 mm, 0.8 mm, 0.9 mm, 1.0 mm, 1.1 mm, 1.2 mm, 1.3 mm, 1.4 mm or 1.5 mm. The tray 3 and the heat conduction member 11 are spaced apart from each other to prevent the tray 3 from transferring motion to the heat conduction member 11 during rotation, which can avoid friction and deformation of the heat conduction member 11, and avoid that the gap between the tray 3 and the heat conduction member 11 is too large and heat cannot be transferred between the tray 3 and the heat conduction member 11.

In one embodiment, the transmission mechanism 6 is a worm drive, so that transmission between two crossed shafts can be achieved without occupying the heightwise direction of the feeder. Specifically, the transmission mechanism 6 includes a rotating shaft 61, a first worm gear 62, a first worm 63, a second worm gear 64 and a second worm 65. The rotating shaft 61 is arranged in the housing 2 along the axial direction of the housing. The first end 611 (see FIG. 2) of the rotating shaft 61 is connected to the housing 2, and the second, opposite end 612 (see FIG. 2) of the rotating shaft 61 passes through the tray 3. The first worm gear 62 is coaxially arranged around the first end 611 of the rotating shaft 61. Helical grooves can be formed on the outer lateral surface of the rotating shaft 61 to form a worm gear. That is, the rotating shaft 61 and the first worm gear 62 are integrally formed. Alternatively, the worm gear and the rotating shaft 61 can be independent components and detachably connected to each other, thereby facilitating replacement.

The first worm 63 is disposed at one side of the rotating shaft 61 and extends in a direction perpendicular to the axis of the rotating shaft 61. The first worm 63 meshes with the first worm gear 62. The second worm gear 64 is coaxially arranged around the first worm 63. The second worm 65 extends in a direction perpendicular to the axis of the first worm 63 and the axis of the rotating shaft 61, and the second worm 65 meshes with the second worm gear 64. An end 651 of the second worm 65 away from the second worm gear 64 is coaxially connected to the output end of the actuator 51. When the output end of the actuator 51 rotates, the second worm 65 is driven to rotate, and the second worm 65 drives the second worm gear 64 to rotate. Since the second worm gear 64 is arranged around the first worm 63, it drives the first worm 63 to rotate. The first worm 63 rotates and drives the first worm gear 62 meshed with the first worm 63 to rotate. Since the first worm gear 62 is arranged around the rotating shaft 61, it drives the rotating shaft 61 to rotate, which drives the tray 3 to rotate. By using the first worm gear 62, the first worm 63, the second worm 65 and the second worm gear 64 that form a two-stage transmission mechanism, the rotation speed of the rotating shaft 61 can be reduced. On the other hand, using the first worm 63 disposed at one side of the rotating shaft 61 can avoid increasing the overall thickness of the feeder.

In other embodiments, the transmission mechanism 6 may only include the rotating shaft 61, the first worm gear 62 and the first worm 63. The end of the first worm 63 is connected to the output end of the actuator 51, which forms a one-stage transmission mechanism.

In one embodiment, in order to achieve the purpose of timed feeding, the pet feeder may include a control panel (not shown) and a circuit board (not shown). The circuit board is arranged at one end of the rotating shaft 61 passing through the tray 3. The control panel is arranged at the side of the circuit board away from the rotating shaft 61 and is electrically connected to the circuit board. The control panel is provided with operation buttons. For example, the operation buttons can be timing buttons. After the rotation time is set, the circuit board controls the actuator 51 to rotate according to the time set by a user, thereby enabling automatic feeding.

It should be noted that one end of the rotating shaft 61 extends out of the tray 3 but does not pass through the cover 4. In order to facilitate the operation of the control panel and to prevent pets from touching the control panel when eating wet food, a protective cover 9 is provided on the cover 4 at a position corresponding to the control panel. The protective cover 9 is detachably connected to the cover 4, so that the control panel can be operated after the protective cover 9 is removed.

Figure 4:
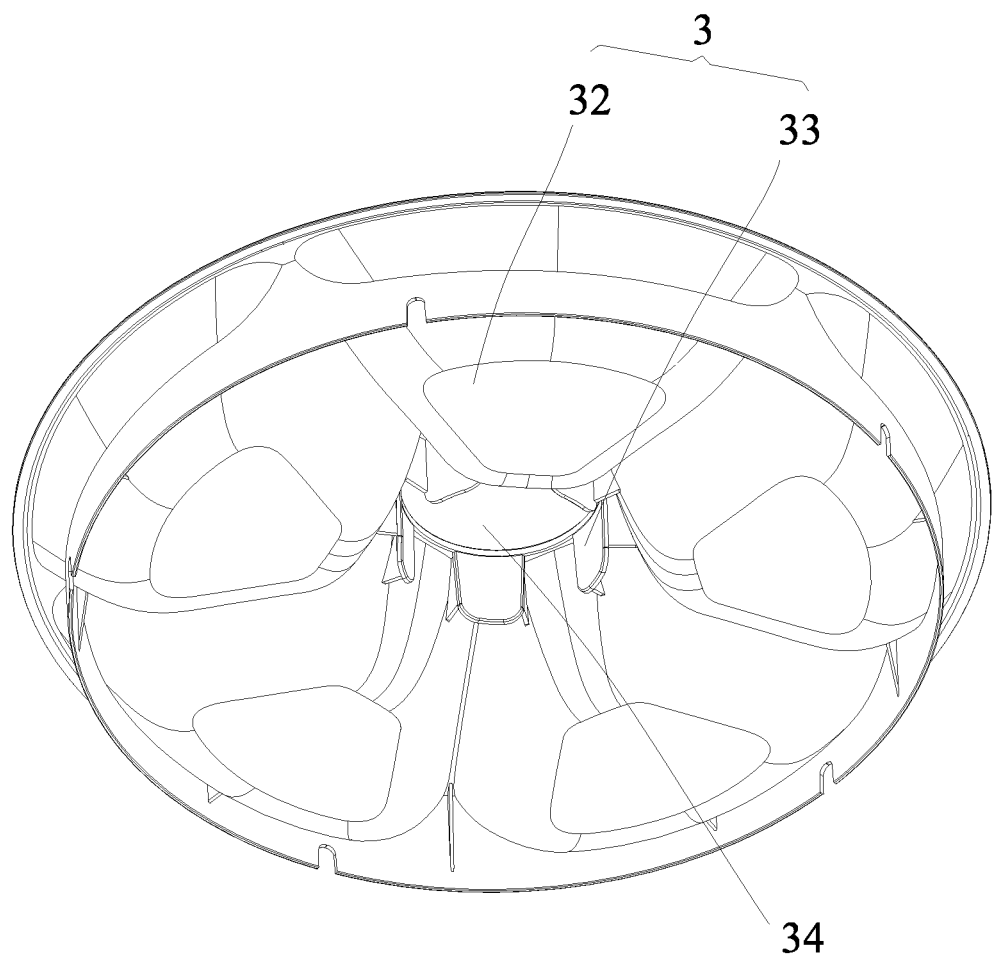
FIG. 4 is an isometric view of a tray of the pet feeder.
Figure 5:
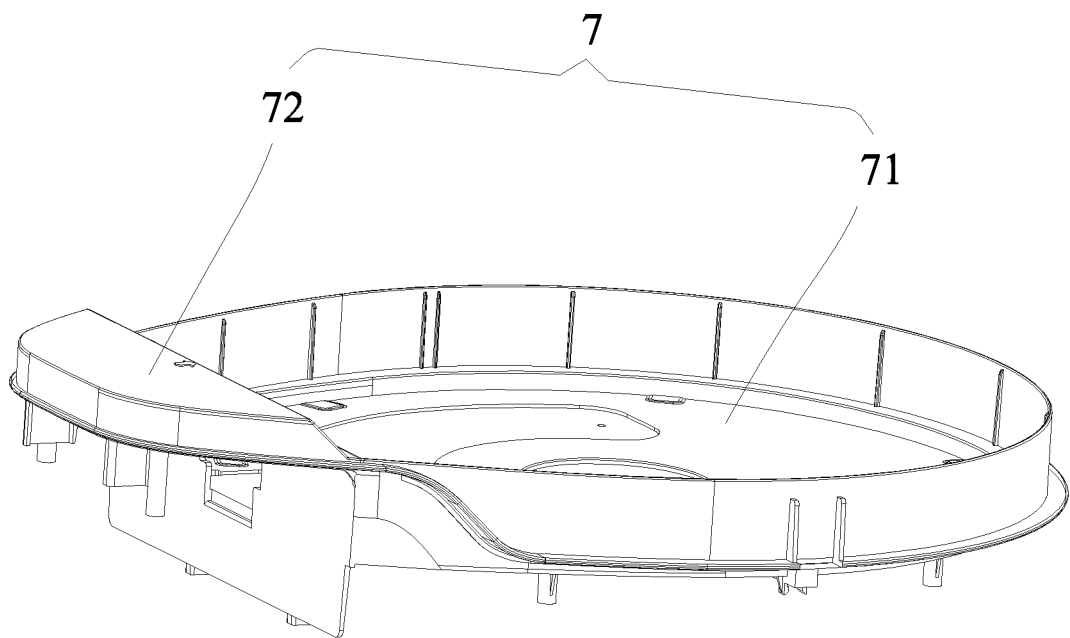
FIG. 5 is an isometric view of an internal frame of the pet feeder.

Referring to FIGS. 4 and 5, in one embodiment, the tray 3 includes a main body 32 and at least one insertion member 33. The main body 32 is provided with at least two compartments 31. The main body 32 defines a through hole 34 for the second end of the rotating shaft 61 to pass through. At least two compartments 31 are arranged around the through hole 34. In one embodiment, the through hole 34 can be defined in the center of the main body 32. Each insertion member 33 is connected to the main body 32 and extends toward the rotating shaft 61 and is arranged around the through hole 34. The rotating shaft 61 defines one or more grooves 610 in a peripheral surface for the at least one insertion member 33 to be inserted into. By inserting the insertion members 33 into the grooves 610, the tray 3 is connected to the rotating shaft 61.

The number of the at least one insertion member 33 can be one, two or more. In order to achieve a more stable connection, multiple insertion members 33 are formed on the tray 3. In other embodiments, the grooves can be defined in the tray 3, and the insertion members can be formed on the rotating shaft 61. By inserting the insertion members into the grooves, the tray 3 can be connected to the rotating shaft 61.

Referring to FIGS. 2 and 7, in one embodiment, the pet feeder further includes an internal frame 7 and a first heat insulating member 8. The internal frame 7 is disposed at the side 301 of the tray 3 facing the housing 2. A first accommodation chamber 201 is formed between the internal frame 7 and the housing 2, and the dissipation member 13 and the thermoelectric cooling member 121 are both arranged in the first accommodation chamber 201. The heat conduction member 11 extends out of the internal frame 7 and is spaced apart from the tray 3, which enables heat to be transferred between thermoelectric cooling member 121 and the tray 3, thereby keep the wet food in the tray 3 fresh.

The first heat insulating member 8 is disposed in the first accommodation chamber 201. The transmission mechanism 6 is disposed on the first heat insulating member 8, passes through the internal frame 7, and is connected to the tray 3. The first heat insulating member 8 is to isolate the room-temperature air in the first accommodation chamber 201 from the tray 3 to ensure that the area of the food tray 3 is an independent cold area.

In one embodiment, the first heat insulating member 8 can be made of expanded polystyrene (EPS) material, which has the advantages of light weight, low thermal conductivity, and low water absorption, thereby effectively preventing heat being transferred, through the middle frame 7, to the heat conduction sheet 11 by the room-temperature air in the third accommodation chamber. Thus, the preservation of the food to be preserved in the tray 3 will not be affected. The first heat insulating member 8 is provided with a mounting chamber 81, and the actuating mechanism 5 is mounted in the mounting chamber 81. It should be noted that the mounting chamber 81 is a through chamber. The housing 2 is provided with a support frame 21 that is arranged corresponding to the mounting chamber 81, and the actuating mechanism 5 is mounted on the support frame 21.

Referring to FIG. 5, the internal frame 7 includes a mounting portion 71 and an extension portion 72. The mounting portion 71 includes a base and a lateral wall extending around the base, forming a hollow space. The heat conduction member 11 and the tray 3 are arranged in the mounting portion 71. The extension portion 72 extends in the horizontal direction from one side of the mounting portion 71. The extension portion 72 and the mounting portion 71 form an accommodation space that receives the thermoelectric cooling member 121 and the beat dissipation member 13. The mounting portion 71 is provided with a through hole for the heat conduction member 11 to pass through. That is, the heat conduction member 11 is disposed in the mounting portion 71 through the through hole, so that the heat can be transferred between the thermoelectric cooling member 121 and the tray 3. By arranging the tray on the mounting portion 71 and arranging the thermoelectric cooling member 121 and the heat dissipation member 13 at one side of the mounting portion 71, it can avoid increasing the overall thickness of the pet feeder to a certain extent.

Figure 6:
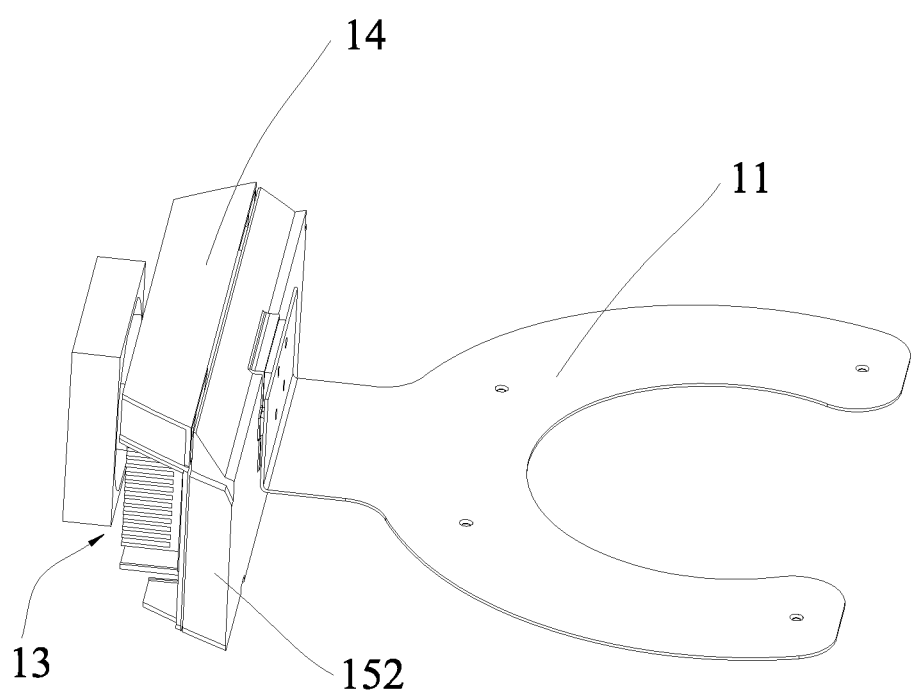
FIG. 6 is an isometric view of an assembly including a heat conduction member, a heat dissipation member, a thermoelectric cooling member, a support member, a first heat insulating member and a second insulating member.

Referring to FIGS. 6 to 8, in one embodiment, the heat dissipation member 13 includes a conductive substrate 130, a height wise number of fins 131 and a cooling fan 132. The conductive substrate 130 is in contact with the second side 1212 of the thermoelectric cooling member 121, and the fins 131 protrude from the conductive substrate 130. The cooling fan 132 blows air directly to the fins 131 to cause the airflow to flow between the fins 131, thereby quickly dissipate the heat on the fins 131 to achieve a rapid heat dissipation effect. It should be noted that the fins 131 may also be heat vaporizing tubes or heat vaporizing fins made of aluminum, and are not limited in their structure.

Referring to FIG. 2. in one embodiment, the cooling fan 132 includes a fan wheel (not shown). The housing 2 defines an air inlet 22 and an air outlet 23. The air inlet 22 is arranged parallel to the cooling fan 132, and the air outlet 23 is arranged at an angle with respect to the cooling fan 132. More specifically, the air inlet 22 is arranged parallel to the fan wheel of the cooling fan 132. The air outlet 23 is arranged at an angle with respect to the fan wheel. In one embodiment, the cooling fan 132 is an axial flow fan, which can push the air to flow along the air inlet 22 and discharge the air from the air outlet 23 around the housing 2.

Referring to FIG. 7, in one embodiment, the thermal conduction member 11 includes a connecting portion 110 and a contact portion 111. The connecting portion 110 is connected to the first side 1211 of the thermoelectric cooling member 121. The contact portion 111 extends from one end of the connecting portion 110 in a direction away from the thermoelectric cooling member 121. The bent portion 111 is to contact the wet food to be preserved. The connecting portion 110 has a sheet-like structure. The end surface of the connecting portion 110 is connected to the surface of the thermoelectric cooling member 121. The contact portion 111 is a sheet-like structure and is to connect with the tray 3 of the pet feeder. Since the contact portion 111 is in surface contact with the wet food to be preserved, the contact area between the heat conduction member 11 and the wet food to be preserved is increased. Thus, a small-volume thermoelectric cooling member 121 can cool a large area of wet food to be preserved, thereby achieving uniform cooling of the wet food to be preserved and keeping the wet food fresh. Furthermore, the wet food to be preserved can be placed on one side of the thermoelectric cooling member 121, thereby avoiding an increase in the overall height of the cooling mechanism.

In one embodiment, the contact portion 111 is a semicircular ring-shaped sheet structure. In other embodiments, the contact portion 111 can be in the shape of a disc, and can be selected according to actual needs.

Referring to FIGS. 7 and 8, in another embodiment, the pet feeder further includes a support member 14 arranged in the housing 2 and a second heat insulating member 151. The heat dissipation member 13, the thermoelectric cooling member 121 and the heat conduction member 11 are connected to the support member 14. The support member 14 provides support to the heat dissipation member 13, the temperature adjustment structure 12 and the heat conduction member 11, improving the overall integration to cool the wet food to be preserved. In order to prevent the heat conduction member 11 from contacting the heat dissipation member 13 and avoid the influence of external room-temperature air on the thermoelectric cooling member 121, the second heat insulating member 151 is arranged at one side of the support member 14 and between the heat conduction member 11 and the heat dissipation member 13, and arranged around the thermoelectric cooling member 121.

In one embodiment, the second heat insulating member 151 is made of expanded polystyrene (EPS) material, which has the advantages of light weight, low thermal conductivity, and low water absorption. Thus, the external room-temperature air can be effectively prevented from contacting with the thermoelectric cooling member 121. The second heat insulating member 151 is provided with a first through hole 1510 that allows the thermoelectric cooling member 121 to pass through and then contact the heat conduction member 11 and the heat dissipation member 13. That is, the thermoelectric cooling member 121 is mounted on the second heat insulating member 151 through the first through hole 1510.

Referring to FIGS. 7 and 8, in one embodiment, the pet feeder further includes a heat conduction block 16 and a third heat insulating member 152. The heat conduction block 16 is arranged between the thermoelectric cooling member 121 and the heat conduction member 11, which can increase the speed of heat transfer and cool the heat conduction member 11. In order to avoid the influence of the external room-temperature air at one side of the heat conduction member 11 on the heat conduction block 16 and the thermoelectric cooling member 121, the third heat insulating member 152 is arranged around the heat conduction block 16 and is located between the thermoelectric cooling member 121 and the heat conduction member 11. Therefore, the influence of external air on the heat conduction block 16 and the thermoelectric cooling member 121 can be eliminated.

In one embodiment, the heat conduction block 16 is made of aluminum material, which has lower cost and better heat conduction performance. The third heat insulating member 152 is made of EPS material, which has the advantages of light weight, low thermal conductivity, and low water absorption, which can effectively prevent the external room-temperature air from contacting the thermoelectric cooling member 121 and the heat conduction member 11. A thermal conductive glue is provided between the thermoelectric cooling member 121 and the heat conduction member 11 to facilitate heat transfer. The third heat insulating member 152 is provided with a second through hole 1520 that allows the heat conduction block 16 to pass through and contact the thermoelectric cooling member 121 and the heat conduction member 11.

Referring to FIGS. 7 and 8, in one embodiment, the support member 14 includes a base plate 141, at least two first side plates 142 and at least two second side plates 143. The base plate 141 is disposed between the second heat insulating member 151 and the third heat insulating member 152. The base plate 141 defines a through hole 1410 for the thermoelectric cooling member 121 to pass through and then contact the heat conduction block 16. The first side plates 142 are formed on a side 1411 of the base plate 141 facing the heat dissipation member 13 and form a second accommodation chamber 1421. The heat dissipation member 13 and the second heat insulating member 151 are received in the second accommodation chamber 1421.

The second side plates 143 are formed on the side 1412 of the base plate 141 facing the heat conduction member 11 and form a third accommodation chamber 1431. The heat conduction block 16 is received in the third accommodation chamber 1431, and the third heat insulating member 152 is arranged around the second side plates 143. That is, the second through hole 1520 of the third heat insulating member 152 is for the second side plates 143 to pass through. The heat conduction member 11 and the heat dissipation member 13 are separated by the base plate 141, thereby preventing contact between the heat conduction member 11 and the heat dissipation member 13. The first side plates 142 can support the heat dissipation member 13 and the second heat insulating member 151, and the second side plates 143 can support the heat conduction block 16 and the heat conduction member 11. The support member 14 can integrate the heat dissipation member 13, the heat conduction member 11 and the thermoelectric cooling member 121, so that they can be placed in different spaces to cool different food to be preserved, and the integration level is high.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A pet feeder comprising:
    a housing;
    a heat conduction member, a temperature adjustment structure and a heat dissipation member that are arranged in the housing, the temperature adjustment structure comprising a thermoelectric cooling member and a control module, the thermoelectric cooling member comprising a first side connected to the heat conduction member and a second side that is opposite the first side and in contact with the heat dissipation member, and the control module configured to control the first side of the thermoelectric cooling member to heat or cool;
    a tray arranged in the housing and connected to the heat conduction member, the tray defining at least two compartments for placing pet food;
    a cover arranged on the tray and defining a window in communication with the at least two compartments; and
    an actuating mechanism arranged in the housing and configured to rotate the tray or the cover;
    a support member arranged in the housing, and the heat dissipation member, the thermoelectric cooling member and the heat conduction member connected to the support member;
    a second heat insulating member arranged between the heat conduction member and the heat dissipation member, and arranged around the thermoelectric cooling member;
    a heat conduction block disposed between the thermoelectric cooling member and the heat conduction member; and
    a third heat insulating member arranged around the heat conduction block and located between the thermoelectric cooling member and the heat conduction member;
    wherein the support member comprises:
        a base plate arranged between the second heat insulating member and the third heat insulating member, and defining a through hole for the thermoelectric cooling member to pass through so as to come into contact with the heat conduction block;
        at least two first side plates arranged at a side of the base plate facing the heat dissipation member, and defining a second accommodation chamber to accommodate the heat dissipation member and the second heat insulating member; and
        at least two second side plates arranged at a side of the base plate facing the heat conduction member, and defining a third accommodation chamber to accommodate the heat conduction block, the third heat insulating member arranged around the at least two second side plates.

2. The pet feeder of claim 1, wherein the control module comprises a driver chip, a controller and a power supply, the driver chip is electrically connected to the thermoelectric cooling member, the controller is electrically connected to the driver chip, and the controller is configured to control a direction of electrical current flowing in the thermoelectric cooling member through the driver chip, and the power supply is electrically connected to the driver chip.

3. The pet feeder of claim 1, wherein the actuating mechanism comprises an actuator and a transmission mechanism that are arranged in the housing, the transmission mechanism is connected between the tray and the actuator, and the tray is spaced apart from the heat conduction member.

4. The pet feeder of claim 3, wherein the transmission mechanism comprises:
a rotating shaft arranged in the housing, the rotating shaft comprising a first end arranged in the housing, and a second end passing through and connected to the tray;
a first worm gear coaxially arranged around the first end of the rotating shaft;
a first worm extending in a direction perpendicular to the rotating shaft, and meshing with the first worm gear;
a second worm gear coaxially arranged around the first worm; and
a second worm extending in a direction perpendicular to the first worm and the rotating shaft and meshing with the second worm gear, wherein an end of the second worm away from the second worm gear is coaxially connected to the actuator.

5. The pet feeder of claim 4, wherein the tray comprises a main body and at least one insertion member, the at least two compartments are defined in the main body, the main body defines a through hole for the second end of the rotating shaft to pass through; the at least one insertion member is connected to the main body and extends toward the rotating shaft and is arranged around the through hole; the rotating shaft defines one or more grooves in a peripheral surface for the at least one insertion member to be inserted into.

6. The pet feeder of claim 1, further comprising:
an internal frame arranged at a side of the tray facing the housing, a first accommodation chamber formed between the internal frame and the housing, the heat dissipation member and the thermoelectric cooling member arranged in the first accommodation chamber, the heat conduction member extending out of the internal frame and connected to the tray; and
a first heat insulating member arranged in the first accommodation chamber, the actuating mechanism arranged on the first heat insulating member.

7. The pet feeder of claim 1, wherein the heat dissipation member comprises:
a conductive substrate in contact with the second side of the thermoelectric cooling member;
a plurality of fins protruding from the conductive substrate; and
a cooling fan that is configured to generate an air flow over the fins.

8. The pet feeder of claim 7, wherein the housing defines an air inlet and an air outlet, the air inlet is arranged parallel to the cooling fan, and the air outlet is arranged at an angle with respect to the cooling fan.

9. The pet feeder of claim 1, wherein the heat conduction member comprises:
a connecting portion connected to the first side of the thermoelectric cooling member; and
a contact portion extending from the connecting portion in a direction away from the thermoelectric cooling member, and is in contact with the tray.

10. A pet feeder comprising:
a housing;
a heat conduction member, a temperature adjustment structure and a heat dissipation member that are arranged in the housing, the temperature adjustment structure comprising a thermoelectric cooling member and a control module, the thermoelectric cooling member comprising a first side connected to the heat conduction member and a second side that is opposite the first side and in contact with the heat dissipation member, and the control module configured to control the first side of the thermoelectric cooling member to heat or cool;
a tray arranged in the housing and in contact with the heat conduction member;
a cover arranged on the tray, the cover and the tray corporately defining one or more spaces for placing pet food; and
an actuating mechanism arranged in the housing and configured to actuate a relative rotation between the tray and the cover so as to allow the pet food in the one or more spaces to be exposed;
wherein the heat conduction member comprises:
a connecting portion connected to the first side of the thermoelectric cooling member; and
a contact portion extending from the connecting portion in a direction away from the thermoelectric cooling member, and is in contact with the tray, wherein the contact portion intersects with the connecting portion, and the thermoelectric cooling member is substantially parallel to the connecting portion.

11. The pet feeder of claim 10, wherein the control module comprises a driver chip, a controller and a power supply, the driver chip is electrically connected to the thermoelectric cooling member, the controller is electrically connected to the driver chip, and the controller is configured to control a direction of electrical current flowing in the thermoelectric cooling member through the driver chip, and the power supply is electrically connected to the driver chip.

12. The pet feeder of claim 10, wherein the actuating mechanism comprises an actuator and a transmission mechanism that are arranged in the housing, the transmission mechanism is connected between the tray and the actuator, and the tray is spaced apart from the heat conduction member.

13. The pet feeder of claim 12, wherein the transmission mechanism comprises:
a rotating shaft arranged in the housing, the rotating shaft comprising a first end arranged in the housing, and a second end passing through and connected to the tray;
a first worm gear coaxially arranged around the first end of the rotating shaft;
a first worm extending in a direction perpendicular to the rotating shaft, and meshing with the first worm gear;
a second worm gear coaxially arranged around the first worm; and
a second worm extending in a direction perpendicular to the first worm and the rotating shaft and meshing with the second worm gear, wherein an end of the second worm away from the second worm gear is coaxially connected to the actuator.

14. The pet feeder of claim 13, wherein the tray comprises a main body and at least one insertion member, the main body defines a through hole for the second end of the rotating shaft to pass through; the at least one insertion member is connected to the main body and extends toward the rotating shaft and is arranged around the through hole; the rotating shaft defines one or more grooves in a peripheral surface for the at least one insertion member to be inserted into.

15. The pet feeder of claim 10, further comprising:
an internal frame arranged at a side of the tray facing the housing, a first accommodation chamber formed between the internal frame and the housing, the heat dissipation member and the thermoelectric cooling member arranged in the first accommodation chamber, the heat conduction member extending out of the internal frame and connected to the tray; and a first heat insulating member arranged in the first accommodation chamber, the actuating mechanism arranged on the first heat insulating member.

16. The pet feeder of claim 10, wherein the heat dissipation member comprises:

a conductive substrate in contact with the second side of the thermoelectric cooling member;

a plurality of fins protruding from the conductive substrate; and a cooling fan that is configured to generate an air flow over the fins.

17. The pet feeder of claim 16, wherein the housing defines an air inlet and an air outlet, the air inlet is arranged parallel to the cooling fan, and the air outlet is arranged at an angle with respect to the cooling fan.

18. The pet feeder of claim 10, further comprising:

a support member arranged in the housing, and the heat dissipation member, the thermoelectric cooling member and the heat conduction member connected to the support member; and a second heat insulating member arranged between the heat conduction member and the heat dissipation member, and arranged around the thermoelectric cooling member.

19. The pet feeder of claim 18, further comprising:

a heat conduction block disposed between the thermoelectric cooling member and the heat conduction member; and a third heat insulating member arranged around the heat conduction block and located between the thermoelectric cooling member and the heat conduction member.

20. The pet feeder of claim 19, wherein the support member comprises:

a base plate arranged between the second heat insulating member and the third heat insulating member, and defining a through hole for the thermoelectric cooling member to pass through so as to come into contact with the heat conduction block;

at least two first side plates arranged at a side of the base plate facing the heat dissipation member, and defining a second accommodation chamber to accommodate the heat dissipation member and the second heat insulating member; and at least two second side plates arranged at a side of the base plate facing the heat conduction member, and defining a third accommodation chamber to accommodate the heat conduction block, the third heat insulating member arranged around the at least two second side plates.

* * * * *